(No Model.)
J. W. MADDEN.
INSECT TRAP.
No. 364,359. Patented June 7, 1887.
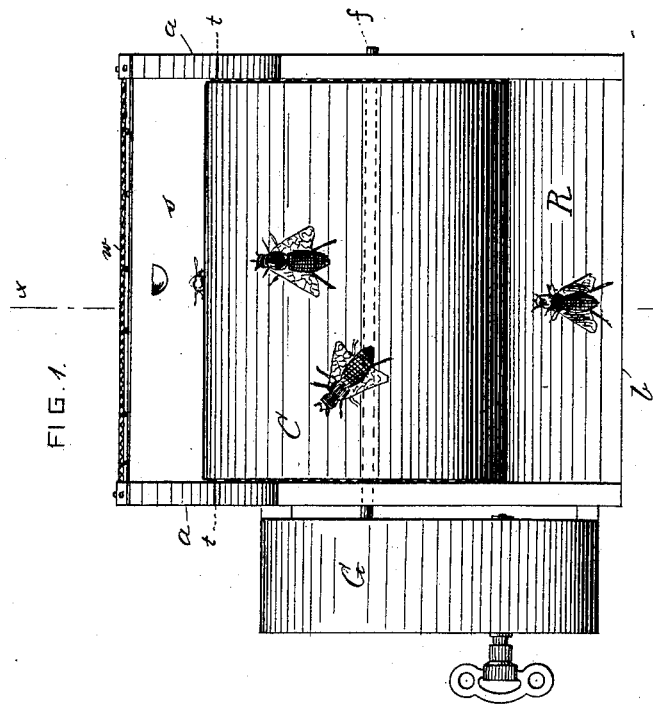
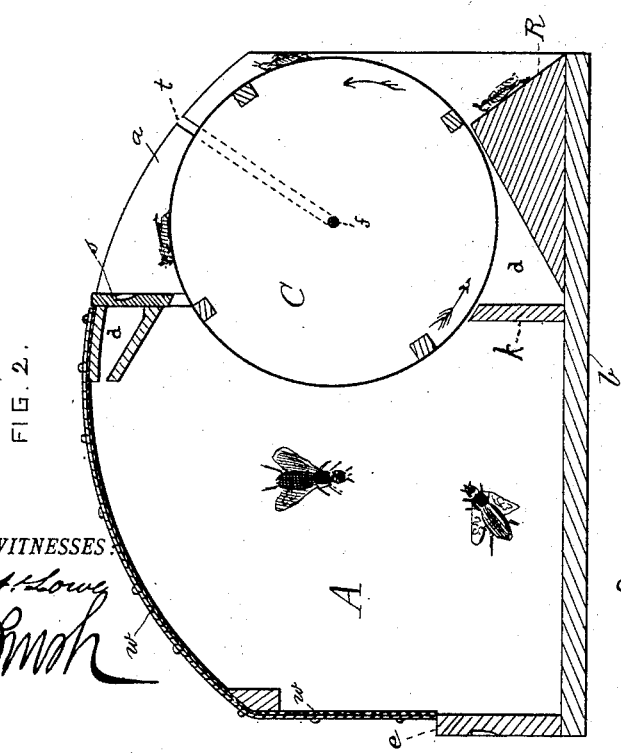
WITNESSES:
INVENTOR
James W. Madden
BY
Geo. M. Baker
ATTORNEY

UNITED STATES PATENT OFFICE.

JAMES W. MADDEN, OF BROOKLYN, NEW YORK.

INSECT-TRAP.

SPECIFICATION forming part of Letters Patent No. 364,359, dated June 7, 1887.

Application filed March 22, 1887. Serial No. 231,911. (No model.)

*To all whom it may concern:*

Be it known that I, JAMES W. MADDEN, of the city of Brooklyn, in the county of Kings and State of New York, have invented certain new and useful Improvements in Insect-Traps, of which the following is a specification.

My invention relates to that class of insect-traps in which is used a revolving cylinder, upon which the bait is placed; and my improvements are designed to make a trap which shall be adapted to entrap cockroaches and other creeping insects, as well as flies. Another object is to provide a trap that shall be simpler in its construction than similar traps which have been made heretofore. To these ends I employ the devices shown in the accompanying drawings, in which—

Figure 1 is a front elevation of my improved trap; and Fig. 2 is a sectional view of the same, taken on the line $x\ x$ of Fig. 1.

My improved insect-trap consists of a box or chamber having a bottom, $b$, and sides $a\ a$, with its top and one end covered with wire-netting $w$. The other end of the box is closed by the cylinder C, slide $s$, and the inclined gangway R.

G is the gearing or clock-work, by means of which the cylinder C is made to slowly revolve. The cylinder or drum C is supported upon an axis, $f$, the ends of which rest in journals in the slots $t\ t$, cut in the sides of the box $a\ a$, as shown in Fig. 2.

$s$ is a slide, which may be raised or lowered to increase or diminish the space between it and the cylinder C, according to the size of the insects which it is desired to entrap.

$e$ is a slide, which can be raised for the purpose of removing the dead insects which have been entrapped in the cage A.

By means of the slots $t\ t$ the drum or cylinder C can be readily removed and replaced whenever it becomes necessary for the purpose of cleaning, &c.

The bait should be spread thinly upon the drum or cylinder C, and the latter caused to revolve slowly by means of the clock-work above referred to. The object of the bait is not to cause the insects to stick to the cylinder, but simply to entice them upon it. The insects feed upon the bait as the slowly-revolving cylinder turns them into the cage A, when they either voluntarily leave the cylinder or are detached therefrom by the remover $k$. The latter does not touch or in any manner rest upon the cylinder C, and it is not intended to act as a scraper for the purpose of killing the insects upon the cylinder. The object of the remover $k$ is only (by being very close to the cylinder, though not touching it) to present an obstruction to the farther progress of the insects upon the cylinder in the direction of the arrow, and to frighten or drive them from the cylinder. As the cage A is light, the insects will naturally remain in it, and, lest they should attempt to escape through the space above or below the cylinder, I interpose the dark spaces $d\ d$.

The revolving cylinder is not placed at the top, but at one end of the cage or box A, and the gangway R is placed below the cylinder, its upper edge being in close proximity to the surface of the cylinder and its lower edge lying in the plane of the bottom of the cage A, and hence very close to the surface upon which the trap may be placed, as shown in the drawings. By this arrangement and location of the cylinder and gangway creeping insects readily gain access to the revolving cylinder. The slide or gate $s$ is placed over and above the cylinder C, and moves in a vertical plane, as shown in Fig. 2. As above stated, the gate may be raised or lowered for the purpose of varying the distance between its lower edge and the surface of the cylinder.

I am aware that fly-traps have been made heretofore in which a revolving prism is combined with a box, and I do not claim, broadly, the use of such revolving prism; but my improved device differs from such traps heretofore made in the novel construction and arrangement of parts herein described.

What I claim, and desire to secure by Letters Patent, is—

1. In an insect-trap, the combination of a cage, a revolving cylinder, with means for rotating the same, and an inclined gangway, said cylinder being placed at one end of the cage in such a position that its surface will revolve in and out of said cage, and the said gangway being placed immediately below the said cylinder, its upper edge being in close proximity to the surface of the cylinder and its lower edge being in the plane of the bottom of the cage, said cylinder and gangway practically closing the end of the cage in which they are placed, substantially as set forth.

2. In an insect-trap, the combination of a cage, a revolving cylinder, and means for rotating the same, and an adjustable slide or gate, said cylinder being placed at one end of the cage, and the slide or gate being placed immediately above the cylinder and adapted to move in a vertical plane, the said cylinder and slide or gate practically closing the end of the cage at which they are placed, substantially as set forth.

3. The insect-trap herein described, consisting of a cage, a revolving cylinder, an adjustable slide or gate and a gangway, said cylinder being placed at one end of the cage, having the slide or gate above it and adapted to move vertically, while the gangway is below the cylinder, with its upper edge close to the surface of the cylinder and its lower edge in the plane of the bottom of the cage, said cylinder, slide, and gangway practically closing the end of the cage at which they are placed, substantially as set forth.

JAMES W. MADDEN.

In presence of—
GEO. M. BAKER,
WM. A. LOWE.